United States Patent
Cohen

(10) Patent No.: US 7,043,747 B1
(45) Date of Patent: May 9, 2006

(54) METHODS AND APPARATUS FOR INFORMATION BROADCASTING AND RECEPTION

(75) Inventor: Thomas Andrew Cohen, Quedjinup (AU)

(73) Assignee: Aceinc Pty Limited, West Perth, WA (US)

( * ) Notice: Subject to any disclaimer, the term of this patent is extended or adjusted under 35 U.S.C. 154(b) by 0 days.

(21) Appl. No.: 09/979,287

(22) PCT Filed: May 22, 2000

(86) PCT No.: PCT/AU00/00608

§ 371 (c)(1),
(2), (4) Date: Jan. 31, 2002

(87) PCT Pub. No.: WO00/72592

PCT Pub. Date: Nov. 30, 2000

(30) Foreign Application Priority Data

May 20, 1999 (AU) .................................... PQ0455

(51) Int. Cl.
*H04N 7/025* (2006.01)
*H04N 7/10* (2006.01)
(52) U.S. Cl. ..................................................... 725/34
(58) Field of Classification Search ............ 725/32–36, 725/88–90, 102; 386/6, 67, 92
See application file for complete search history.

(56) References Cited

U.S. PATENT DOCUMENTS

| | | | |
|---|---|---|---|
| 4,163,254 A | 7/1979 | Block et al. | 358/122 |
| 4,484,217 A | 11/1984 | Block et al. | 358/84 |
| 4,841,387 A * | 6/1989 | Rindfuss | 360/72.1 |
| 5,710,970 A | 1/1998 | Walters et al. | 455/3.1 |
| 5,721,827 A | 2/1998 | Logan et al. | 395/200.47 |
| 5,732,216 A * | 3/1998 | Logan et al. | 709/203 |
| 5,778,187 A | 7/1998 | Monteiro et al. | 395/200.61 |
| 5,808,608 A | 9/1998 | Young et al. | 345/327 |
| 5,818,510 A | 10/1998 | Cobbley et al. | 348/7 |
| 5,861,881 A | 1/1999 | Freeman et al. | 345/302 |
| 5,887,243 A | 3/1999 | Harvey et al. | 455/3.1 |
| 5,892,536 A | 4/1999 | Logan et al. | 348/13 |
| 5,986,692 A | 11/1999 | Logan et al. | 348/13 |
| 6,088,455 A | 7/2000 | Logan et al. | 380/200 |
| RE36,801 E | 8/2000 | Logan et al. | 348/571 |
| 6,199,076 B1 | 3/2001 | Logan et al. | 707/501.1 |
| 6,233,389 B1 | 5/2001 | Barton et al. | 386/46 |

* cited by examiner

*Primary Examiner*—Vivek Srivastava
(74) *Attorney, Agent, or Firm*—Wallenstein, Wagner & Rockey, Ltd.

(57) ABSTRACT

Broadcasting methods are disclosed which allow a user to choose between passive or active participation. Information is broadcast to a set-top box or from a database of content. Content is carried in segments which are scheduled into programs. Segments may be updated without altering the schedule which determines a program. A user may depart from a scheduled program or depart from a broadcast and enter a unicast, at will. The user may subsequently rejoin a scheduled replay or broadcast.

9 Claims, 1 Drawing Sheet

METHODS AND APPARATUS FOR INFORMATION BROADCASTING AND RECEPTION

CROSS-REFERENCE TO RELATED APPLICATIONS

This application claims priority to copending Patent Cooperation Treaty application entitled "Methods and Apparatus for Information Broadcasting and Reception," having serial number PCT/AU00/00608, having priority date May 20, 1999, having international publication number WO 00/72592 A1, which is entirely incorporated herein by reference.

TECHNICAL FIELD

The present invention is generally related to broadcasting and reception and, more particularly, is related to methods and apparatus for broadcasting to or from a database of programmed content so that a viewer may opt between a scheduled program and a viewer-determined program.

BACKGROUND OF THE INVENTION

In stylistic terms, and from the viewer's perspective, conventional analogue television programming is inflexible. The viewer may watch a variety of channels, each having fixed shows. However the content available to the viewer is limited, at any point in time to the preestablished real time broadcast.

Digital television broadcasting and the Internet have introduced the systems and methods by which a viewer may interact with information and entertainment services which are delivered to the home. Because digital information is easier to store and manipulate than analogue information, digital televisions and peripheral devices are known to incorporate memory and microprocessor capability for the purpose of allowing the viewer to review, zoom, and show multiple channels simultaneously.

Digital networks such as the Internet allow a viewer to request information independently of the requests made by other viewers. Some Internet information is broadcast in real time. However, because the bandwidth of the Internet is severely limited (for most users), real time broadcasting of voluminous data such as television quality video is not an option yet. Streaming and buffering techniques give the illusion of continuous broadcasts in a low bandwidth environment. Thus, a heretofore unaddressed need exists in the industry to address the aforementioned deficiencies and inadequacies.

SUMMARY OF THE INVENTION

It is an object of the invention to provide methods and apparatus for enabling a viewer to watch an uninterrupted program of scheduled segments or to depart from the predetermined schedule and return with or without discontinuity. Accordingly, several methods of program distribution are disclosed. A method of program distribution comprises:

(a) granting electronic access to a group of users;
(b) distributing to the group, simultaneously, a first program having a content which has a user independent start time;
(c) receiving a request from a user; and
(d) initiating a second unicast distribution of the same segments to the user where the same segments time shifted and time shiftable relative to the program which has the user independent start time.

There is also provided a method of program distribution comprising:

(a) granting electronic access to a group of users;
(b) distributing to the group, simultaneously, a first program having a content which has a user independent start time;
(c) receiving a request from a user;
(d) terminating distribution to the user, in response to the request; and
(e) initiating a second distribution of a second program to the user from a database having entries from which the first program is constituted.

The invention further provides a method of distributing a database of content, the method of distributing comprising the steps of: distributing a database to a group of users; and distributing a replay schedule of database entries, the schedule used by user software which effects a play sequence of database content in accordance with the schedule.

Other systems, methods, features, and advantages of the present invention will be, or will become, apparent to one having ordinary skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon a clearly illustrating the principles of the present invention. Moreover, in the drawings, like reference numerals designate corresponding parts throughout the several views.

DETAILED DESCRIPTION OF THE INVENTION

The present invention relates to the distribution of information to a group of users. These users are analogous to television viewers in that they are seeking information or entertainment. However, unlike conventional television, the invention provides the user with a degree of optional flexibility in (a) what the user watches (or listens to), (b) when in time the user participates and (c) how the user participates (actively or passively). In order to achieve this level of flexibility and user choice, network and computer technology is deployed to create a novel type of user experience.

In order to achieve consistency throughout this disclosure and claims, the following definitions are observed. A program is defined as a sequence of segments. The sequence may be expressed as a schedule. A program may be like a conventional show or a sequence of shows. A program is considered different to another if it has the same sequence of segments, but the content of one or more segments is different from the other. A segment need not have a fixed length. A segment has a fixed content at any one point in time. The content of a segment may be changed or updated from time to time. For example, a segment "Z"$_{(n)}$ might be called "The Six O'clock News" and represented by a symbol $Z_a$, where Z designates "The Six O'clock News" and the subscript a, b, c, etc. designates the specific and unique version. Therefore, $Z_a$ does not have the same content as $Z_b$. Further a program may be expressed as a schedule of segments like $X_a$, $Y_a$, $Z_a$, or $X_a$, $Y_a$, $Z_b$, where $X_a$, $Y_a$, $Z_a$, and $X_a$, $Y_a$, $Z_b$, are considered programs having the same schedule but different consent. Because $Z_b$ might be updated with reference to $Z_a$, $Z_b$ may be a different duration.

Looping to a particular and specific schedule like $X_{(n)}$, $Y_{(n)}$, $Z_{(n)}$ can therefore be seen to result in programs with different content which are said to derive from the same schedule.

Content is understood to be taken broadly as any information which can be ascertained by a user and includes without limitation video, sound, images, text, streams and links. From a user perspective, content originates from either a database of content (either remote or local) or from any source on the network from which the user derives programs.

A time, such as a start time, is considered user independent if a user cannot influence that time. A time is considered user dependent if a user can designate or influence that time.

Figure 1:
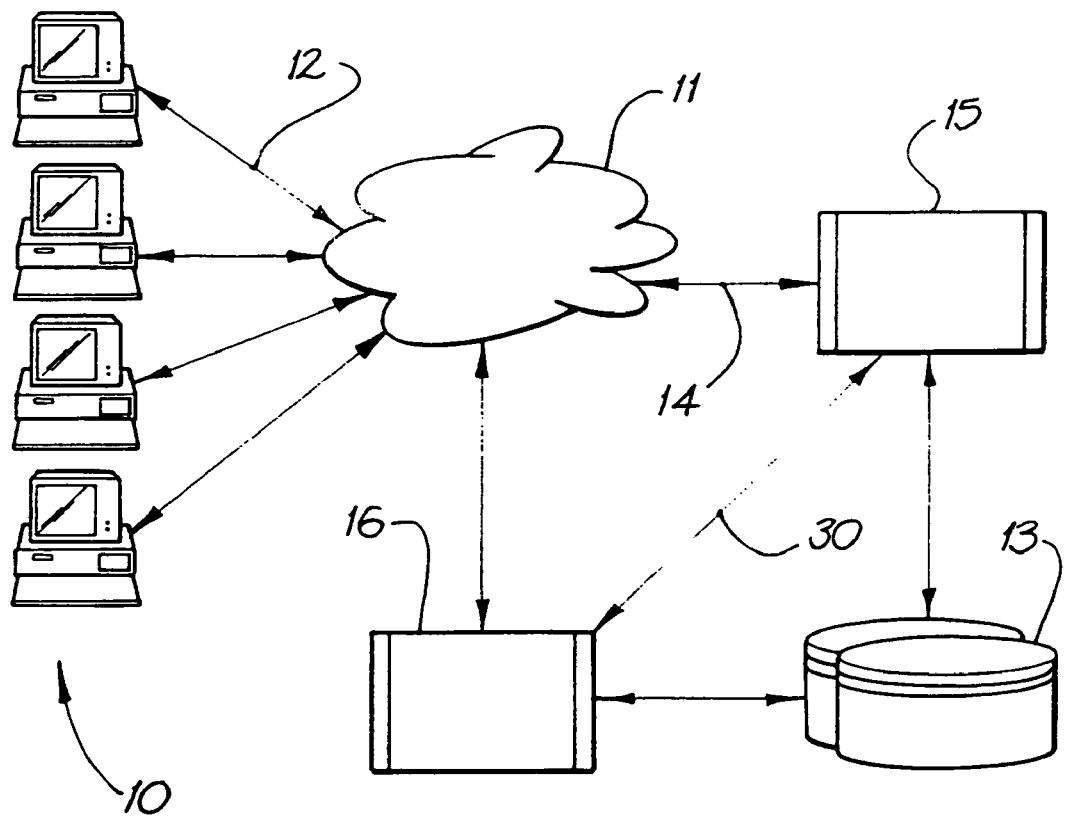
FIG. 1 is a schematic diagram of a first embodiment of the invention adapted to broadband delivery.

As shown in FIG. 1, a personal computer (PC) client 10 (or a thin client such as a set top box or network computer) may be connected to a broadband network 11 by a high speed digital connection 12. Content from a master content store 13 is delivered over the network 11 in two ways. First, a program 14 may be delivered by a master schedule server 15 which obtains segments for program content from the database or content store 13. This may be directed toward clients using multicasting or similar technology, known to those having ordinary skill in the art. The program may loop and will run uninterrupted if the user exerts no control. The master schedule server 15 may, by user request, also deliver objects not included in the program stream or objects which are in the scheduled stream, but not at the time that the request is made. These objects and streams may be accessed by the client or viewer from links embedded in the program stream 14 via the interactive channel provided over the network 11 and preferably, only from links embedded in the program stream 14. A user may request Internet content or a time shifted version of a current program.

In order to handle requests for Internet content, the client's request may be transmitted to the master server 15, then forwarded 30 to an Internet server 16. How the Internet content is displayed by the client 10 depends on how the client 10 is configured. In some embodiments, the Internet server 16 is part of the program network and may be used to (a) log a client's request, (b) notify the master server if it would be advantageous for the master server 15 to terminate a transmission 14 to a particular client 10.

A program may be repeated or looped by user command. A program might also change as the content of its segments is altered or updated. A program may be replaced by a different program (different sequence of segments) or an updated program. In this way the viewer, with his client and software, controls (for example) a multicast or broadcast output to himself and effectively allows the viewer to change to unicasting, at will. "Permanent" controls comprising GUI style buttons or links are provided in the user interface.

Figure 2:
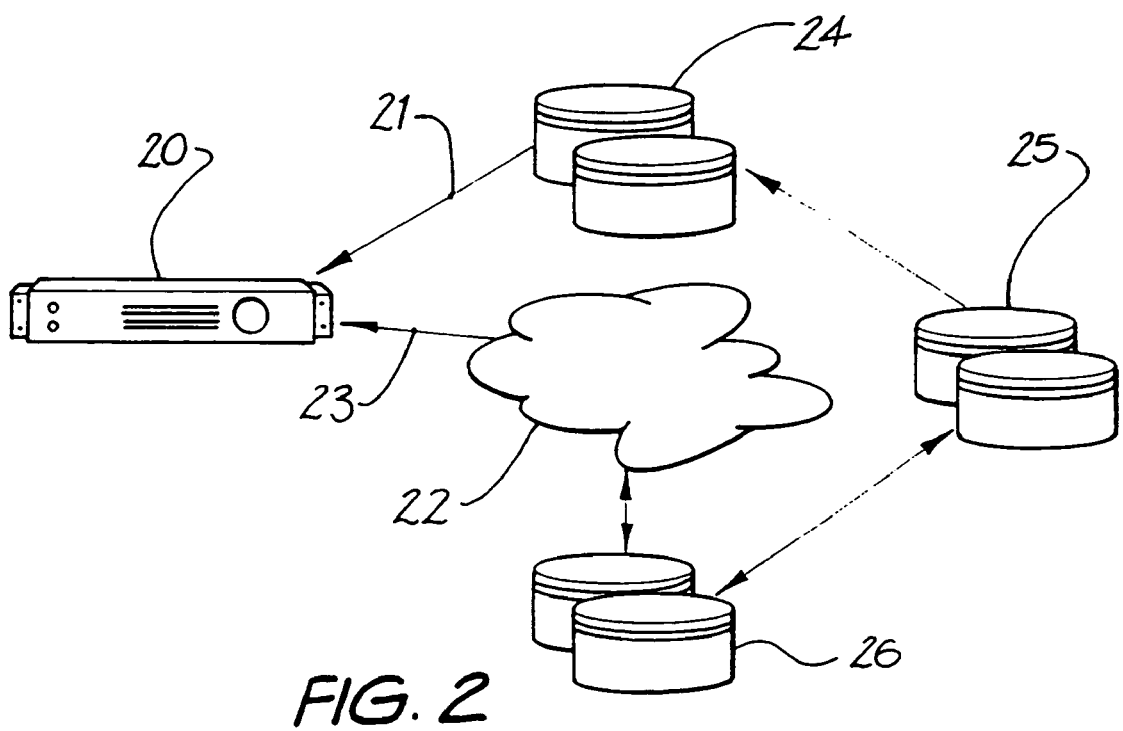
FIG. 2 is a schematic diagram of a second embodiment of the invention using a set top box.

As shown in FIG. 2, a specially adapted digital TV or set top box ("STB") 20 receives data from both a live broadcast source 21 and the Internet 22. The STB preferably includes a hard disk, modem, IR remote control interface and video output. The storage capacity of the STB is sufficient to cache all relevant broadcast objects in a database so that it can play back all scheduled content from local storage. Thus, it can mirror the live broadcast as of the most recent broadcast. The STB transmits requests over the Internet line 23. A program from a live to air system 24 comprises one or more segments, this being a subset of a content store database 25 and is broadcast without interruption. Viewer requests made over the Internet 22 may be received by an Internet server 26 and satisfied wholly or in part from data originating in the content store 25. The content store 25 may provide streaming data, objects or other data. In order to minimize the data transfer required to present a program, some or all of the program content may be synthesized by the STB from minimal data (like VRML or virtual reality mark-up language) contained in the broadcast. The STB may use a WINDOWS™ operating or other GUI or object oriented operating system.

Accordingly, the medium consists of a dynamically changing, on-demand local database of segments, links and digital objects in all possible formats—including high quality graphics, audio, video and animation. A portion of the database may be given a real time replay sequence by control software—though this sequence can be interrupted by the user at any time. Once interrupted, the relationship to real time might be abandoned completely, or restored at some later time by the user. Other parts of the database will not be replayed unless selected by the user (so will have no real time relationship).

Format

The "channel" created by the automated replay, from a schedule, of a portion of the content database will be composed of one or more programs and a range of optional transitions between programs. Transitions may be one or more segments or programs. A program may be composed of one or more segments with a range of transitions between segments. The channel will play automatically the one or more scheduled programs and may then loop. For the system illustrated in FIG. 1, the automated, uninterrupted sequence of replay of programs or "shows" will be the same for all users and will be in real time (like conventional broadcasting). In the STB embodiment depicted in FIG. 2, the automated, uninterrupted sequence of replay of programs will be the same for all users that initiate replay of the preprogrammed database at roughly the same time.

Unlike conventional broadcasting, the STB user however will have the option of halting replay, jumping forwards and backwards in the sequence, or branching out from various points in the sequence (see below). The content of each program or show may be varied at any time by the receipt by the database of more recent segments (a live segment might not yet have arrived or might no longer be available). The program to be replayed at any given time will be the most recent complete version of the show held in the cache at the time that particular show is due to start (as determined by the replay of the sequence or as selected by the user). Each run through of the complete service might therefore be of a different duration and with different content (all or part) in each show, but the order of the programs or segments may be constant (unless interrupted by the user). The total duration of a replay of all content in a single pass of the entire sequence cannot therefore be predicted.

User Controls

There will be two or more forms of controls—channel controls (constant) and program controls (specific to each program). There may be specific segment controls as well.

The channel controls in the form of a GUI will include an icon for each program and fast forward/pause/rewind functions. The icon for the current segment will be disabled. Clicking on an icon will advance the service replay to the designated segment immediately (via an appropriate optional transition). The pause function will stop replay. In the case of a live show which is not archived, recommencement of play will be in real time rather than at the point of pause—i.e. content might be lost. The fast forward and rewind functions will advance/reverse in segment steps within a program, via an appropriate transition. The fast forward will be disabled during a live show.

The program controls will pause the program replay and initiate a sub-show loop, which will terminate at the beginning of the segment in which the loop was initiated. So, for example, during an advertisement 'show', the program control button may allow the user to pause the ad and enter into a home shopping loop. The service or channel controls will remain visible during any sub-show loop replay, and the show controls initiating the loop will include a "back" or "end" control terminating the loop.

The use of any of these controls may result in subsequent segments in fact being different in content to what would have been the case had the controls not been used to alter the 'natural' sequence of replay. This would occur in the case of either: (a) a next segment in the sequence having been updated as a result of the user taking extra time to get to that segment (by, for example, replaying certain prior segments, or going on a sub-show loop); or (b) an update that, in the 'normal' course, would have been received, not yet having been received at the time the user reaches the relevant show as a result of the user advancing replay (by use of the icons or fast forward controls) more rapidly than real time. Users will be offered the option of returning to real time, thereby missing content that was 'replayed' while the user had paused or interrupted replay in any way.

Access to sub-show loops or other excursions can be preferably made available from any segment or segments in any show (see below).

Sample Operation of Channel Controls

Pause: pause replay (control changes to 'go', press again to recommence replay)
Fast Forward: advance to a fixed point or in any size steps, then replay
Rewind: rewind to a fixed point or in steps of any size, then replay
Icon: advance/rewind to start of designated segment (or program), then replay

Sample Operation of Show Controls

Start: pause show replay, commence sub-show loop
Stop: exit sub-show loop, return to commencement of segment from which the user entered the sub-show loop A program will not be updated while a user is in the sub-show loop (though later shows in the sequence might be).

It should be emphasized that the above-described embodiments of the present invention, particularly, any "preferred" embodiments, are merely possible examples of implementations, merely setting forth for a clear understanding of the principles of the invention. Many variations and modifications may be made to the above-described embodiment(s) of the invention without substantially departing from the spirit and principles of the invention. All such modifications are intended to be included herein within the scope of this disclosure and the present invention and protected by the following claims.

The invention claimed is:

1. A method of playing a digital media program, the method comprising:
   receiving a first content segment and a second content segment at a user device, the first content segment and the second content segment defining at least a portion of the digital media program;
   receiving a schedule at the user device, the schedule defining a playback sequence associated with the first content segment and the second content segment;
   playing the digital media program at the user device;
   interrupting the digital media program at a first time in response to a first user action;
   receiving a second user action; and
   resuming playback of the digital media program at a second time in response to receiving the second user action, wherein the resumed playback skips a portion of the digital media program substantially equal to an amount of time between the first time and the second time, and wherein interrupting the digital media program comprises interrupting the digital media program to play a third content segment, wherein the third content segment not being associated with the playback sequence.

2. A method of playing a digital media program, the method comprising:
   receiving a first content segment and a second content segment at a user device, the first content segment and the second content segment defining at least a portion of the digital media program;
   receiving a schedule at the user device, the schedule defining a playback sequence associated with the first content segment and the second content segment;
   playing the digital media program at the user device;
   interrupting the digital media program at a first time in response to a first user action;
   receiving a second user action;
   resuming playback of the digital media program at a second time in response to receiving the second user action, wherein the resumed playback skips a portion of the digital media program substantially equal to an amount of time between the first time and the second time; and,
   receiving a third content segment, wherein the third content segment replaces the first content segment in the digital media program.

3. A method as defined in claim 2, further comprising:
   receiving a third user action indicative of a pause command;
   pausing playback of the digital media program in response to receiving the third user action, the pause occurring at a point in the digital media program;
   receiving a fourth user action; and
   resuming playback of the digital media program at the point in the digital media program in response to receiving the fourth user action.

4. A method as defined in claim 2, wherein the schedule defines a looping sequence of content segments.

5. A method as defined in claim 4, wherein a content segment in the looping sequence of content segments is at least one of replaced, omitted, and deleted.

6. A method of playing a digital media program, the method comprising:
  receiving a first content segment and a second content segment at a user device, the first content segment and the second content segment defining at least a portion of the digital media program;
  receiving a schedule at the user device, the schedule defining a playback sequence associated with the first content segment and the second content segment;
  playing the digital media program at the user device;
  interrupting the digital media program at a first time in response to a first user action;
  receiving a second user action; and
  resuming playback of the digital media program at a second time in response to receiving the second user action, wherein the resumed playback skips a portion of the digital media program substantially equal to an amount of time between the first time and the second time, wherein playing the digital media program at the user device comprises playing the digital media program at a user-independent start time.

7. A method of playing a digital media program, the method comprising:
  receiving a first content segment and a second content segment at a user device, the first content segment and the second content segment defining at least a portion of the digital media program;
  receiving a schedule at the user device, the schedule defining a playback sequence associated with the first content segment and the second content segment;
  receiving a user-independent start time associated with the schedule;
  receiving a user playback command at a user playback time, the user playback time being after the user-independent start time; and
  starting playback of the digital media program in response to receiving the user playback command, wherein the playback skips a beginning portion of the digital media program substantially equal to an amount of time between the user-independent start time and the user playback time.

8. A method as defined in claim 7, wherein the schedule defines a looping sequence of content segments.

9. A method as defined in claim 8, wherein a content segment in the looping sequence of content segments is at least one of replaced, omitted, and deleted.

* * * * *